United States Patent [19]

Matsuzaki et al.

[11] Patent Number: 5,270,959
[45] Date of Patent: Dec. 14, 1993

[54] BIAS CORRECTION APPARATUS OF GYRO

[75] Inventors: Shin-ichi Matsuzaki; Kenji Okamoto, both of Osaka, Japan

[73] Assignee: Sumitomo Electric Industries, Ltd., Osaka, Japan

[21] Appl. No.: 813,667

[22] Filed: Dec. 27, 1991

[30] Foreign Application Priority Data

Jan. 10, 1991 [JP] Japan ............................ 3-001434

[51] Int. Cl.$^5$ ............................................ G01C 19/00
[52] U.S. Cl. ........................ 364/571.02; 364/571.01; 364/453; 364/449; 364/571.04; 73/1 E
[58] Field of Search ............... 364/571.02, 453, 454, 364/449, 571.04, 571.05, 571.07, 571.01, 575; 73/1 E

[56] References Cited

U.S. PATENT DOCUMENTS

| | | | |
|---|---|---|---|
| 3,622,764 | 11/1971 | Brendes et al. | 364/571.02 |
| 4,193,039 | 3/1980 | Massa et al. | 364/571.02 |
| 4,470,124 | 9/1984 | Tagami et al. | 364/571.02 |
| 4,524,357 | 6/1985 | Nakamura et al. | |
| 5,065,612 | 11/1991 | Ooka et al. | 364/571.02 |
| 5,115,238 | 5/1992 | Shimizu et al. | 364/449 |

FOREIGN PATENT DOCUMENTS 366249  5/1990  European Pat. Off. .
3346434 7/1985  Fed. Rep. of Germany .

Primary Examiner—Jack B. Harvey
Assistant Examiner—Jae H. Choi
Attorney, Agent, or Firm—Lane, Aitken & McCann

[57] ABSTRACT

A bias correction apparatus comprising a gyro, bias calculation means for reading output data of the gyro every a certain fixed period after the apparatus is turned on and for calculating a bias value of the gyro on the basis of the read output data, storage means for storing the bias value calculated by the bias calculation means, and bias correction means for correcting angular velocity data of a vehicle obtained from the gyro output data with the bias value stored in the storage means. When calculating a first bias value after the apparatus is turned on, the bias calculation means calculates the bias value by reading the gyro output data every a shorter period than the certain fixed period.

2 Claims, 3 Drawing Sheets

BIAS CORRECTION APPARATUS OF GYRO

FIELD OF THE INVENTION

The present invention relates to a bias correction apparatus of a gyro which can obtain accurate angular velocity data by correcting a bias (or called an offset) which is contained in the angular velocity data obtained by a gyro (or called a turning angular velocity sensor), such as an optical fiber gyro, mechanical type gyro, vibration gyro and gas rate gyro.

DESCRIPTION OF THE PRIOR ART

In order to detect the heading of a vehicle travelling on an arbitrary place of a road network, there is known a heading detection apparatus which is provided with a gyro for detecting the instantaneous angular velocity of a vehicle and which obtains the current heading of the vehicle by integrating information about the angular velocity detected by the gyro.

In a case where the heading of the vehicle is obtained by a heading detection apparatus using the gyro, the current heading $\theta$ of the vehicle is calculated by the following equation (1):

$$\theta = \theta_0 + \delta\theta \tag{1}$$

where $\delta\theta$ is angular velocity data and $\theta_0$ is a heading obtained at the time of the preceding sampling.

On the basis of this heading data $\theta$ and the travel distance data $\delta 1$ obtained from a wheel sensor, current vehicle's location data (Px, Py) can be obtained by adding the east-west directional component $\delta x$ ($=\delta 1 \times \cos \theta$) and south-north directional component $\delta y$ ($=\delta 1 \times \sin \theta$) of the travel distance data $\delta 1$ to the previous vehicle's location data (Px', Py').

In fact, the gyro output is an analog value, this value is converted into a digital value by an A/D converter and supplied to a computer, and then a turning angle is obtained by reading the digital value out of the computer. Furthermore, by comparing an absolute heading obtained with the aid of a terrestrial magnetism sensor with the heading data obtained from the gyro output, heading data of higher accuracy can be obtained.

The gyro tends to generate an output (bias) due to the influence of temperature or humidity, even when the gyro output should be zero during the time the vehicle moves in a straight line or during the time the vehicle is at a stop. This bias output is accumulated if it is repeatedly processed by the above mentioned equation (1), so a heading departing from the actual heading of the vehicle is sensed.

In order to remove the influence of the bias, it is therefore necessary to make a bias correction. For this bias correction, there has been proposed a bias correction method, in which angular velocity data during the time a vehicle is at a stop are obtained, an averaged bias value during that time is obtained, and the output of the gyro as the vehicle moves again is corrected with the averaged bias value.

In that method the bias of the angular velocity output can be corrected based on the data during the time the vehicle is at a stop, so the angular velocity data during the next travel will become accurate because the data do not contain the bias.

In the above mentioned method, it is important how the bias immediately after a vehicle moves is obtained. That is, if the bias value obtained during the previous travel is used, the bias itself will drift during the vehicle's stop (e.g., the period from the previous day to today), so an accurate bias cannot be obtained.

Therefore, when the vehicle moves again, it is necessary to use a new value as the bias value. When the new value is used, it must be accurate. The reason is that if a new value selected is inaccurate, errors will remain in the travel thereafter and accurate heading data cannot be obtained.

Then, it can be considered that an averaged value of the angular velocity data obtained from the start of the engine of the vehicle to the vehicle move is used as a bias value as the vehicle moves. However the time it takes the vehicle to move from the start of the engine is short, there is the problem that the number of bias data is insufficient to obtain a correct bias value.

Since the angular velocity data always contain noise components, it is necessary that, in order to obtain a correct bias value, a large number of data are sampled and then the sampled data are averaged. For example, if the number of data is required to be 100 and the cycle of a break-in process for obtaining the data from the gyro and calculating an angle is 0.1 second, 10 seconds ($=0.1 \times 100$) are needed. There is no problem if the vehicle stops for 10 seconds. However, if the vehicle moves before 10 seconds elapse, a bias value will not be obtained. As a result, since the previous bias value or averaged bias value of the gyro (i.e., zero) is used, an accuracy in the heading detection is reduced.

It is, accordingly, an object of the present invention to provide a bias correction apparatus which is capable of obtaining an accurate bias value at all times even immediately after the vehicle moves and correcting angular velocity data with the accurate bias value.

SUMMARY OF THE INVENTION

In accordance with one important aspect of the present invention, there is provided a bias correction apparatus comprising a gyro, bias calculation means for reading output data of the gyro every a certain fixed period after the apparatus is turned on and for calculating a bias value of the gyro on the basis of the read output data, storage means for storing the bias value calculated by the bias calculation means, and bias correction means for correcting angular velocity data of a vehicle obtained from the gyro output data with the bias value stored in the storage means. When calculating a first bias value after the apparatus is turned on, the bias calculation means calculates the bias value by reading the gyro output data every a shorter period than the certain fixed period.

In accordance with another important aspect of the present invention, there is provided a bias correction apparatus comprising a gyro, bias calculation means for reading output data of the gyro every a certain fixed period after the apparatus is turned on and for calculating a bias value of the gyro on the basis of the read output data, storage means for storing the bias value calculated by the bias calculation means, and bias correction means for correcting heading data, which are obtained by integrating angular velocity data of a vehicle obtained from the gyro output data, with the bias value stored in the storage means. When calculating a first bias value after the appratus is turned on, the bias calculation means calculates the bias value by reading the gyro output data every a shorter period than the certain fixed period.

In accordance with the present invention, immediately after the apparatus is turned on, the gyro output data are read in every a short period of time, so a large number of data are accumulated until the vehicle moves. Therefore, since the bias value of the gyro can be obtained on the basis of a large number of data, the bias value of the gyro can be corrected with accuracy even if the time it takes the vehicle to move is short.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENT

Figure 1:
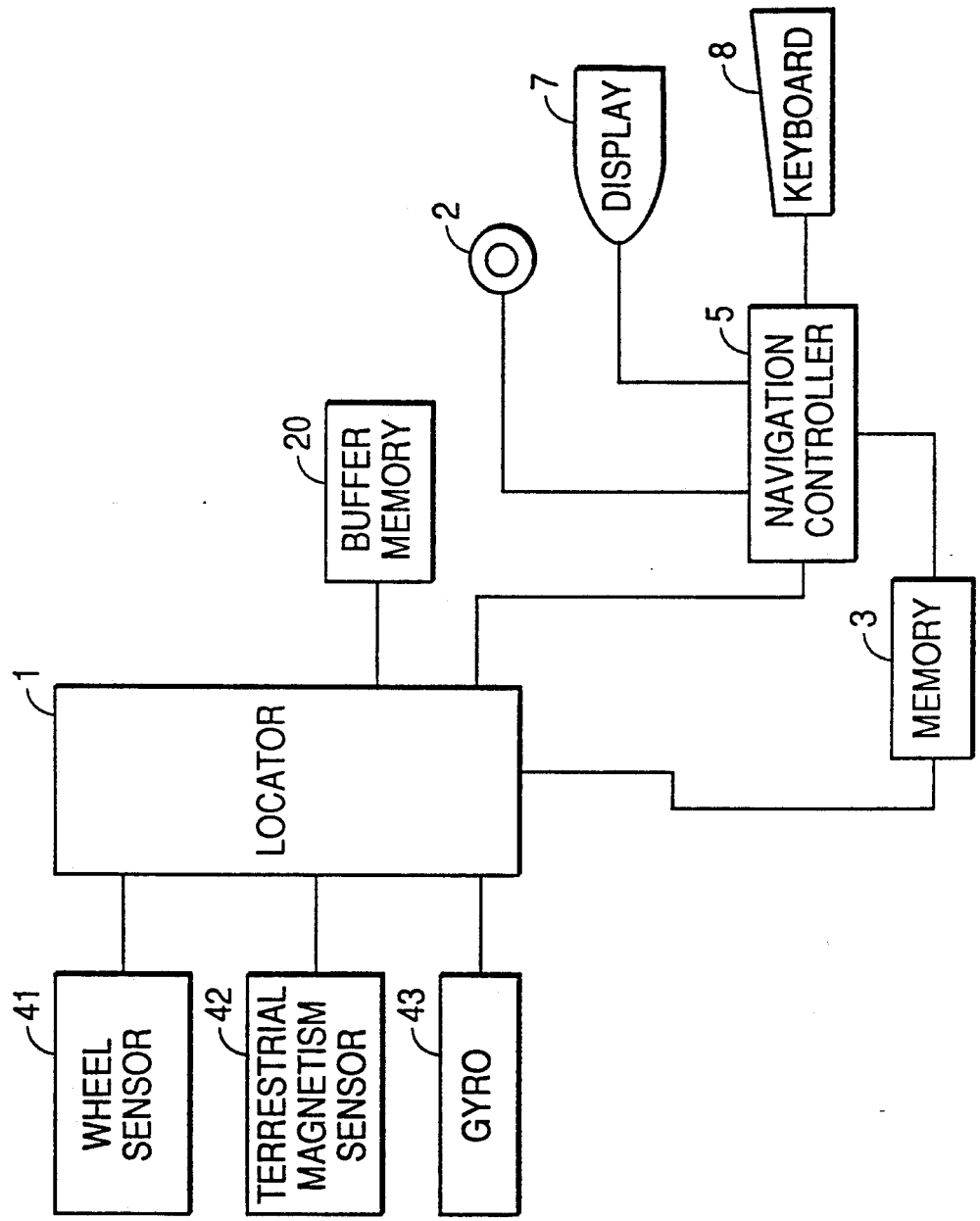
FIG. 1 is a block diagram of a vehicle navigational system into which a bias correction apparatus of the present invention is incorporated.

Referring to FIG. 1, there is shown a vehicle navigational system into which a bias correction apparatus of the present invention is incorporated. The vehicle navigational system here means an apparatus which reads heading data obtained from the output of a gyro, calculates a current estimated heading of a vehicle from a value of the heading data and the previous estimated heading, and calculates a current location of the vehicle from the current estimated heading and data of distances traveled.

The vehicle navigational system comprises a wheel sensor 41 for sensing the number of rotations of the left and right wheels of a vehicle (this sensor is used as a distance sensor), a terrestrial magnetism sensor 42, and a gyro 43. The gyro 43 is selected from an optical fiber gyro for reading a turning angular velocity as a phase change in coherent light, a vibration gyro for sensing a turning angular velocity with the aid of a cantilever vibration technique of an piezoelectric element, a mechanical type gyro, or the like. The vehicle navigational system further comprises a road map memory 2 having road map data stroed therein, and a locator 1. The locator 1 calculates an estimated heading of a vehicle on the basis of the output data sensed by the gyro 43 and the terrestrial magnetism sensor 42, calculates a current location of the vehicle from the estimated heading and the data from the wheel sensor 41, and transmits the current vehicle location to a memory 3. The vehicle navigational system further comprises a buffer memory 20 attached to the locator 1, and a navigation controller 5. The navigational controller 5 reads the current vehicle location out of the memory 3, displays it on a display 7, together with a road map, and interfaces with a keyboard 8.

The above mentioned locator 1, for example, obtains the number of rotations of the wheels by counting the number of pulses of the output pulsed signal from the wheel sensor 41 with the aid of a counter, and calculates data of travel distances per unit time by multiplying the count data outputted from the counter by a predetermined constant representative of a distance per one count, and obtains a relative change in the heading of the vehicle from the gyro 43 to calculate heading output data of the vehicle. In addition, the locator 1 obtains the output data of the gyro 43 each a certain fixed period To that the vehicle is at a stop, and averages the obtained output data to obtain a bias value. The locator 1 corrects the above mentioned heading output data of the vehicle with the aid of the bias value, so it also has a function of correcting the heading output data of the vehicle.

The buffer memory 20 is one which has stored therein the bias data of the gyro 43 during the time the vehicle is at a stop.

The above mentioned road map memory 2 comprises a mass storage medium memory such as a CD-ROM, IC memory card and magnetic tape, and has road map data of a predetermined range stored in advance therein.

The above mentioned display 7 is one which displays road map during travel, a current vehicle location, and a heading of the vehicle with the aid of a CRT (Cathode Ray Tube), a crystalline panel, etc.

The above mentioned navigation controller 5 is constituted by a figure processor, image processing memory and the like, and performs the retrieval, the switch of a reduced scale, and the scroll of a road map on the display 7.

The bias correcting processes by the vehicle navigational system as constructed above will hereinafter be explained. The vehicle navigational system, on the basis of the output data of each sensor, calculates and displays the position and heading of a vehicle on the display 7, together with road map. At the same time, the vehicle navigational system accesses the output data of the gyro 43 every a certain fixed sampling time To and integrated the angular velocity of the vehicle. The integrated angular velocity is used to update the heading of the vehicle.

Figure 2:
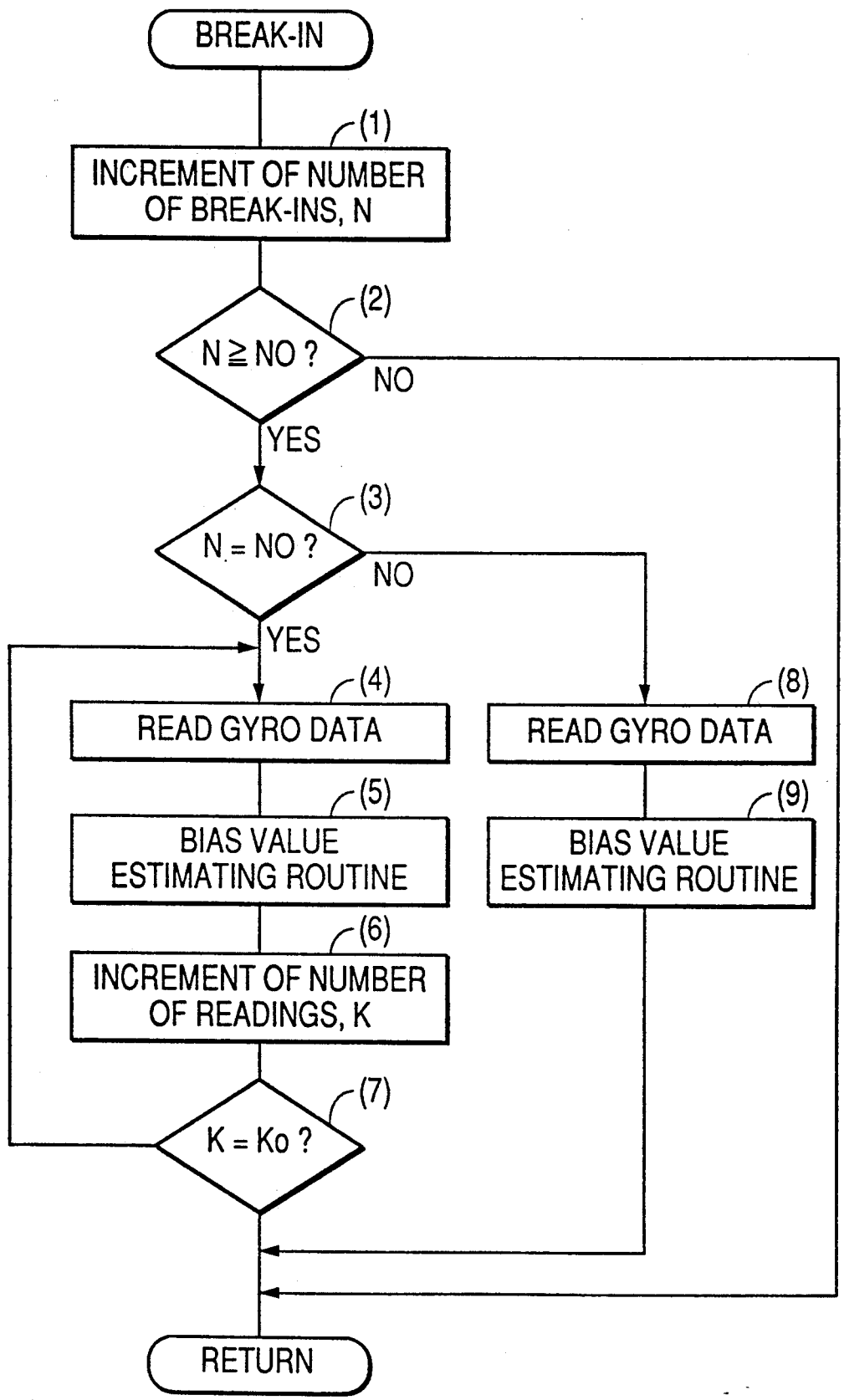
FIG. 2 is a flow chart illustrating how the bias correction is made.

FIG. 2 illustrates how the angular velocity is integrated.

In step 1, a count N (the initial value of N is 0) representing the number of break-ins is increased. In step 2, it is determined if N is greater than a prescribed number of times, No. This prescribed number of times, No, is set in correspondence with the warm-up time that the gyro 43 generates a normal output. If it is assumed that the warm-up time is 0.5 seconds and the break-in is made every 0.1 second, No=5 will be selected.

If N is greater than No, the step 2 advances to step 3, in which it is determined if N is equal to No. When N=No, that is, the number of break-ins has reached No, the step 3 advances to step 4. In the step 4, the data from the gyro 43 are accessed. The step 4 advances to step 5, in which bias-value estimating routine is implemented. Then, the number of accessed data, K, is increased in step 6. In step 7, a loop of steps 4 through 6 is repeated until K reaches a predetermined number of times, Ko. If it is assumed that the sum of the time for accessing the data of the gyro 43 in the step 4 and the time needed for estimating the bias value in the step 5 is about 0.1 millisecond and Ko is 100, it will take 0.1 second to repeat the loop of steps 4–6 100 times. That is, the angular velocity data to be obtained for 0.1 second is 100 in number. It is noted that since the gyro output fluctuates finely, an accurate averaged value, that is, bias value can be obtained even if an averaging process is performed based on the data obtained for a short period of 0.1 second.

If in the step 3 the number of break-ins, N, exceeds the prescribed number of times, No, then the step 3 advances to step 8 in which the gyro data are read in one time. In step 9, bias-value estimating routine is implemented as before. In that case, the readin of the gyro data and the bias-value estimating routine are implemented every the cycle of the break-in (for example, 0.1 second). As will be described later, since the bias-value estimating routine is a process in which a bias value is obtained if the number of gyro data reaches a prescribed number of times. Therefore, if the prescribed number of times is 100, for example, one bias value will be obtained every 10 seonds×0.1=100.

Figure 3:
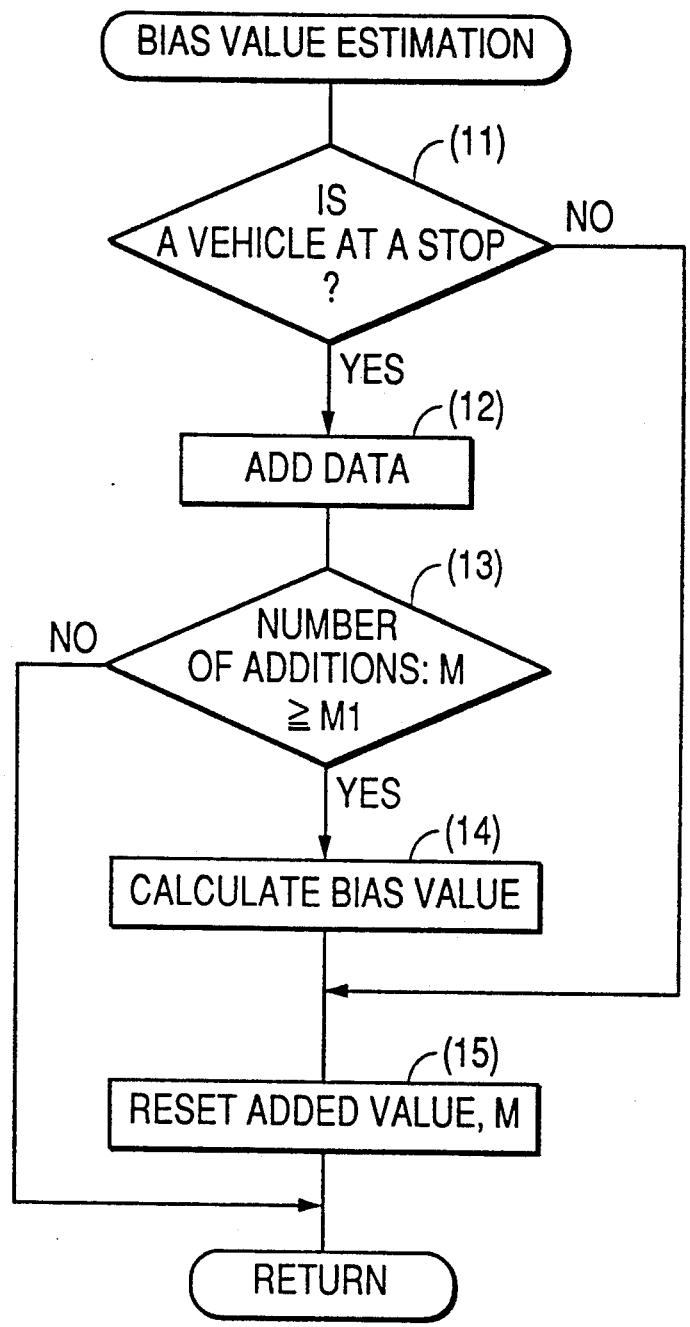
FIG. 3 is a flow chart illustrating how an estimated bias value is determined.

The bias-value estimating routine will hereinafter be described in conjunction with FIG. 3. In the bias-value estimating routine, each time the prescribed number of the gyro data is added up, an averaging process is performed and then a bias value is obtained.

First, it is determined in step 11 if a vehicle is at a stop. This determination can be performed by whether the wheel sensor 41 detects the movement of the vehicle or whether the gyro output is above a predetermined value. If it is determined that the vehicle is at a stop, then the step 11 advances to step 12 in which the read data are added up. In step 13, it is determined if the number of additions of data, m, is greater than a prescribed number of times, m1. The prescribed number of times, m1, is set to a necessary number of times for obtaining a fully reliable gyro bias value, and for example, m1 is set to 100. If it is determined that the number of additions of data, m, is above the prescribed number of times, m1, the step 13 advances to step 14 in which a bias value is calculated. This calculation, for example, is performed by dividing the added value by the number of additions, m. That is, the bias value can be obtained by calculating an averaged value. The averaging process reduces the noise contained in the output data of the gyro 43, so an accurate bias value can be obtained. In step 15, the added value of the data and the number of additions are reset. On the other hand, if in the step 11 it is determined that a vehicle is not at a stop, the step 11 advances directly to the step 15. The reason for this is that, once the vehicle travels, the bias value drifts during travel. Therefore, the previous bias value is not used even if the vehicle stops.

As described above, at the time that the number of break-ins, N, has reached the prescribed number of times, No, other processes are not performed and only the loop of steps 4 to 6 is repeated to read a large number of the data of the gyro 43 and to estimate a bias value. The time it takes the number of break-ins, N, to reach the prescribed number of times, No, corresponds to the warm-up time of the gyro 43 and do not need to be too long, so a large number of gyro data can be read in at a stretch immediately after the warm-up time, and a bias value can be estimated. Therefore, a sufficient number of data can be obtained before the vehicle starts to move, and an accurate bias value can be obtained. Thereafter, as described in the steps 8 and 9, one data of the gyro 43 is read in every the prescribed sampling time To and the estimation of the bias value is made.

Furthermore, the data of the terrestrial magnetism sensor 41 may be used together with the data of the gyro 43. The current location of a vehicle may be calculated from the heading data obtained and the distance data obtained from the output of the wheel sensor 41. In that case, a map matching method may be used in which the calculated current location of the vehicle is compared with road map data, an estimated heading of the vehicle is corrected by evaluating a degree of correlation with the road map data, and the current location of the vehicle is set on road (Japanese Patent Laid-open Publication No. 63-148115, Japanese Patent Laid-open Publication No. 64-53112). The map matching method is well known in the prior art, so a description will not be given.

According to the present invention, immediately after the apparatus is turned on, the gyro output data are read in every a short period of time, so a large number of data are accumulated until the vehicle moves. Therefore, since the bias value of the gyro can be obtained on the basis of a large number of data, the bias value of the gyro can be corrected with accuracy even if the time it takes the vehicle to move is short. The present invention can calculates an accurate bias value at all times and correct heading data, so that it can be utilized in the estimation of the heading and location of a vehicle.

While the subjection invention has been described with relation to the preferred embodiment, various modifications and adaptations thereof will now be apparent to those skilled in the art. All such modifications and adaptations as fall within the scope of the appended claims are intended to be covered thereby.

What we claim is:

1. A bias correction apparatus comprising:

a gyro;

bias calculation means for reading output data of said gyro every a certain fixed period after the apparatus is turned on and for calculating a bias value of said gyro on the basis of the read output data;

storage means for storing said bias value calculated by said bias calculation means; and bias correction means for correcting angular velocity data of a vehicle obtained from the gyro output data with said bias value stored in said storage means, when calculating a first bias value after the apparatus is turned on, said bias calculation means calculating said first bias value by reading said gyro output data every a shorter period than said certain fixed period.

2. A bias correction apparatus comprising:

a gyro;

bias calculation means for reading output data of said gyro every a certain fixed period after the apparatus is turned on and for calculating a bias value of said gyro on the basis of the read output data;

storage means for storing said bias value calculated by said bias calculation means; and bias correction means for correcting heading data, which are obtained by integrating angular velocity data of a vehicle obtained from the gyro output data, with said bias value stored in said storage means, when calculating a first bias value after the apparatus is turned on, said bias calculation means calculating said first bias value by reading said gyro output data every a shorter period than said certain fixed period.

* * * * *